United States Patent Office 2,849,291
Patented Aug. 26, 1958

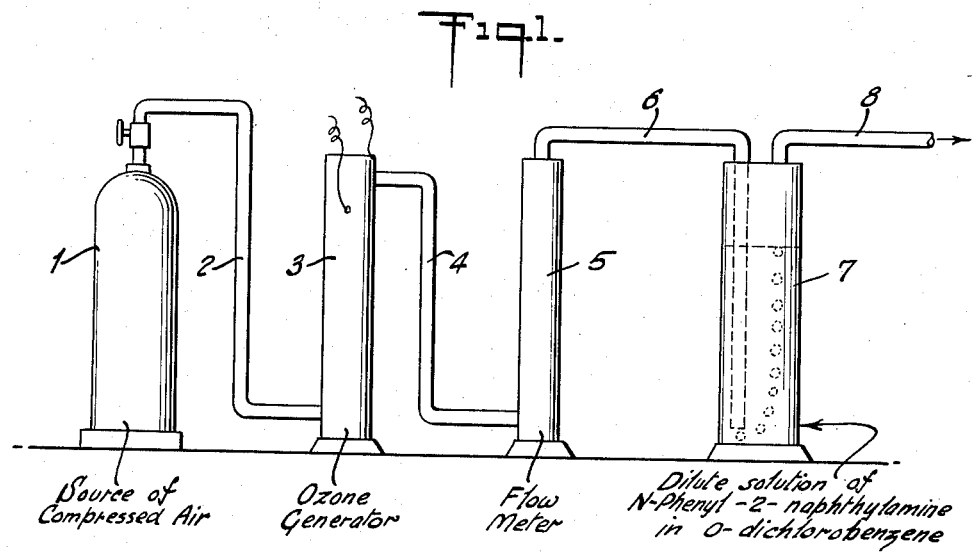
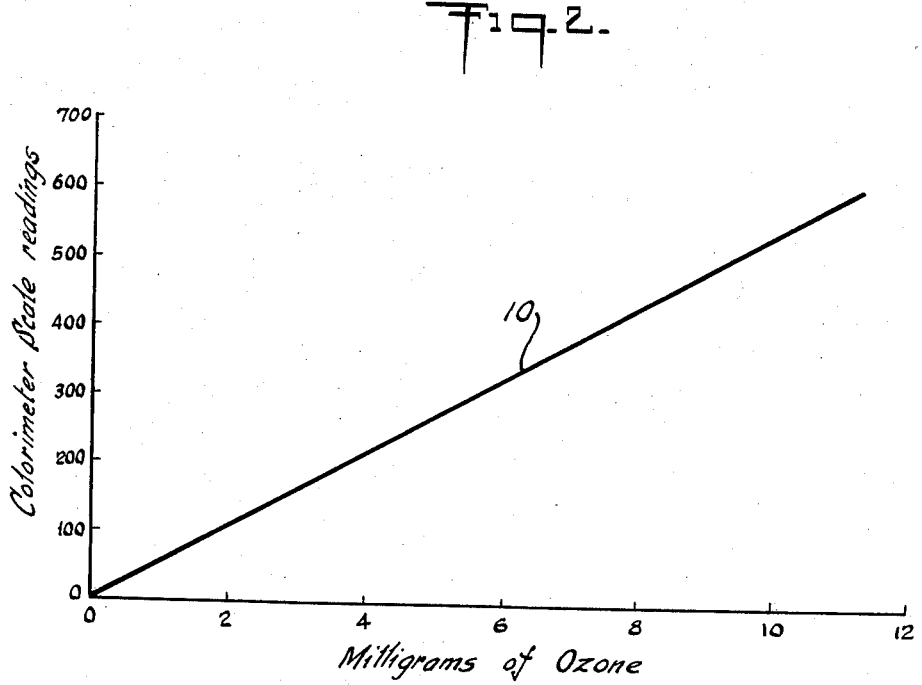

2,849,291

COLORIMETRIC PROCEDURE FOR THE QUANTITATIVE MEASUREMENT OF ATMOSPHERIC OZONE

Albert R. Allison, Brooklyn, Alvin D. Delman, Plainview, Alban E. Ruff, New York, and Bernard B. Simms, Franklin Square, N. Y.

Application November 13, 1957, Serial No. 696,298

8 Claims. (Cl. 23—232)

(Granted under Title 35, U. S. Code (1952), sec. 266)

The invention described herein may be manufactured and used by or for the Government of the United States of America for governmental purposes without the payment of any royalties thereon or therefor.

This invention relates to a new colorimetric procedure for the quantitative measurement of atmospheric ozone. Investigation has established that elastomeric materials are degraded by ozone, and in work on methods and means to minimize or overcome such degradative effects of ozone, a simple technique for the precise quantitative measurement of the ozone concentration in different specimens of air has become of considerable importance. Prior aqueous colorimetric methods of determining ozone concentrations have yielded erratic results due to interference from trace amounts of oxidizing agents such as oxides of nitrogen. In the iodometric procedures recommended in the literature, the reaction of ozone with potassium iodide is significantly affected by the pH of the reacting medium and is truly quantitative only in neutral solution, and the results become progressively more inaccurate with increasing absorption time.

An object of the invention is to provide an improved and simple, non-aqueous, colorimetric and rapid method for the quantitative measurement of atmospheric ozone, which will be suitable for use with low concentrations of ozone and unaffected by the presence of oxygen and oxides of nitrogen, which will be specific, sensitive and reproducible, which will require a minimum of apparatus, which employs only relatively simple and inexpensive apparatus, and which may be performed by persons of medium skill.

In the accompanying drawing:

Fig. 1 is a schematic diagram of laborotory apparatus that may be employed in performing the method of this invention; and Fig. 2 is a colorimeter calibration chart employed in the practice of this method.

In addition to the apparatus illustrated in Fig. 1 and the chart illustrated in Fig. 2, one also employs a suitable colorimeter, not shown, but available in the open market and commonly used in chemical laboratories. One such colorimeter which is suitable for this use and was used in the tests hereinafter recited, is identified as a Klett-Summerson photoelectric colorimeter, Model M3896, fitted with a #42 filter, having an approximate absorption range of 400–465 millimicrons.

When a specimen of ozone containing air is to have a determination made of its ozone concentration in accordance with this invention, a measured quantity of the specimen air is brought into intimate, direct contact with a test solution of N-phenyl-2-naphthylamine in o-dichlorobenzene, at room temperature and atmospheric pressure, until a substantial color change is produced in such test solution by the ozonization of that solution from the ozone carried in such air specimen. The chromogenic reaction so obtained varies with the concentration of ozone, in accordance with Beer's law.

An aliquot of the ozonized test solution is removed and its color measured in a suitable colorimeter. With the colorimeter reading so obtained reference is then made to the graph in Fig. 2, where by locating on the graph line the position vertically corresponding to the colorimeter reading, one can then locate on the horizontal base through the graph line the milligrams of ozone which will produce that color change in an identical solution. One may determine the volume of specimen air used to obtain the particular color change in the test solution, which may be ascertained from the rate of air flow and the duration of the flow. This volume of air is corrected for temperature and atmospheric pressure to any selected basic reference temperature and pressure, such as, for example, to 25° C. and 760 millimeters, so that final results of different tests may be compared under similar conditions. With the information so obtained, one then mathematically calculates the ozone concentration in the air specimen being examined, by using the following equation:

Ozone concentration (milligrams per liter) =
$$\frac{\text{colorimeter scale reading} \times \text{milligrams of ozone equivalency}}{\text{corrected volume}}$$

where the ozone equivalency is obtained from the graph shown in Fig. 2.

The intimate, direct contact between the solution and the air specimen may be obtained in any suitable manner, but is easily obtained by bubbling the air specimen through the test solution. Simple apparatus for this purpose is illustrated in Fig. 1 where a source 1 of air under pressure is connected by pipe 2 to one end of the ozone creating chamber of an ozone generator 3. Such generators are readily available, one suitable generator being identified as a "Safe-T-Aire" lamp #2851 plain, marketed by Hanovia Chemical and Manufacturing Company. The outlet of this generator is connected by pipe 4 to a flow meter 5, and a delivery pipe 6 from this meter extends downwardly into the closed ozonizing chamber of a housing 7 and opens into that chamber near the bottom thereof, and well below the level of a measured amount of the test solution provided in that chamber. The air after bubbling through the test solution is allowed to escape through pipe 8. When the air specimen to be examined for its ozone concentration is provided, the ozone generator is not employed, and the air specimen is passed through the flow meter 5 and then bubbled through the test solution in housing 7.

The test solution is very dilute, because greater accuracy is obtained with dilute solutions, and stronger test solutions would be a waste of reagent material. Optimum results are obtained by the use of about a 0.01 M solution of the N-phenyl-2-naphthylamine in o-dichlorobenzene, and this solvent, preferably should be substantially free of water because the solute is insoluble in water. Accordingly, the solvent is preferably redistilled and dried over a drying material such as calcium chloride prior to use. One may obtain such a 0.01 M solution by dissolving 0.439 gram of the N-phenyl-2-naphthylamine in 200 ml. of redistilled o-dichlorobenzene.

In the ozonization reaction, the results obtained at different flow rates were the same, and by running similar tests where the air specimen contained oxides of nitrogen or using oxygen alone, it was determined that oxygen alone and the oxides of nitrogen do not affect the chromogenic reaction by the ozone in any way. In fact it was found that concentrations in specimen air tested of oxides of nitrogen in amounts even greater than encountered in air samples obtained during smog conditions in Los Angeles, California, had no apparent effect on the intensity of the color produced in the test solution during ozonization.

The ozone equivalence of the colorimeter scale readings in terms of milligrams of ozone, shown in Fig. 2, and which may vary with different makes of colorimeters, must be obtained as a calibration for the readings of different makes of such instruments. One satisfactory way of making such a calibration may be described, using the apparatus illustrated schematically in Fig. 1. Ordinary air under pressure from the tank or source 1 is passed through an ozone generator 3 where the air is ozonized to some extent not accurately regulatable. This ozonized air is then passed through the flow meter 5 and bubbled through the test solution in housing 7. When substantial color change has been caused in the test solution, aliquots of the ozonized test solution were removed at selected time intervals and measured in the colorimeter. The colorimeter readings were taken, and the volume of air determined for each such aliquot samples.

These readings were plotted on the vertical coordinates in Fig. 2. Since the concentration of ozone in each air sample from the ozone generator 3 could not be known, due to lack of knowledge of how rapidly the ozone was being created in the generator, the aliquot samples of test solution were individually examined according to known procedures for chemically determining the concentration of ozone in the test solutions. One such known procedure which is satisfactory is identified as the iodometric procedure which when carefully performed gives adequately accurate determination of the ozone concentrations. The ozone concentrations so determined for the aliquot sampler by the iodometric procedure are plotted on the horizontal co-ordinate or abscissa in Fig. 2, and this gives a graph line 10 in Fig. 2 which is a practically straight line representing the milligrams of ozone in such test samples corresponding to the colors of those samples according to the colorimeter readings. Once this graph is obtained for each make of colorimeter, after one obtains colorimeter readings on air specimens, reference to this graph will enable one to read off the ozone concentration according to any colorimeter reading. This is a convenient and practical procedure for comparing the colors of test solution samples with the colors of solution samples having known concentrations of ozone therein, where the test solutions are identical for all.

While test solutions of other ozonizable materials can be used, the solutions of N-phenyl-2-naphthylamine in o-dichlorobenzene have been found to be the most satisfactory so far, since the graph line when using such solutions passes through the zero at the intersection of the vertical and horizontal coordinates, which enables one to read the ozone concentrations directly without making adjustments due to failure of the graph to pass through zero when the colorimeter reading and the ozone concentration are both zero. It also is very satisfactory as the test solution because its ozonization is not affected by the presence of oxygen, alone, and oxides of nitrogen. The results of an example run in accordance with this invention are illustrated in the following Table #1:

TABLE 1

Effects of ozonized air on o-dichlorobenzene solutions of N-phenyl-2-naphthylamine

| Ozonization time (min.) | Colorimeter readings [1] | | | |
|---|---|---|---|---|
| | Flow rate (cubic meter per hour) | | | |
| | 0.05 | 0.10 | 0.15 | 0.20 |
| 5 | 71 | 71 | 71 | 71 |
| 10 | 147 | 147 | 147 | 145 |
| 15 | 224 | 224 | 224 | 224 |
| 20 | 300 | 300 | 300 | 300 |

[1] Results were identical for each of four determinations made at the respective flow rates.

The preparation of calibration data for use in preparing the graph of Fig. 2 is illustrated in the following Table #2:

TABLE 2

Calibration data (milligrams ozone vs. colorimeter scale readings)

| Ozonization time (min.) | Ozonized air [1] | |
|---|---|---|
| | Colorimeter scale reading | Ozone equivalency [2] (milligrams) |
| 5 | 71 | 1.410 |
| 10 | 147 | 2.820 |
| 15 | 224 | 4.230 |
| 20 | 300 | 5.640 |

[1] Results are identical for flow rates of 0.05, 0.10, 0.15, and 0.20 cubic meter per hour, respectively.
[2] Calculated using the results of iodometric measurements of ozone concentration.

The measurement of ozone concentrations in atmospheric air, for example, has been found to be accurate for concentrations as low as about 6 parts of ozone per 100,000,000 parts of air, and as high as about 600 parts of ozone per 1,000,000 parts of air. Normal atmospheric air may contain about 6 to 10 parts of atmospheric ozone per 100,000,000 parts of air, but in smog conditions found in or near some cities, the air may contain as much as about 25–30 parts of ozone per 100,000,000 parts of air.

It will be understood that various changes in the materials, details, proportions and steps, which have been herein described and illustrated in order to explain the nature of the invention, may be made by those skilled in the art within the principle and scope of the invention as expressed in the appended claims.

We claim:

1. A non-aqueous method for determining atmospheric ozone concentrations which comprises passing a stream of atmospheric air containing ozone in intimate direct contact with a known quantity of a dilute solution of N-phenyl-2-naphthylamine in o-dichlorobenzene at room temperature and atmospheric pressure until a substantial color change occurs in said solution, measuring the color of a specimen of said colored solution in a colorimeter, in comparison with the measured colors of solutions containing known amounts of ozone, determining the volume of ozone bearing air employed to effect such color change, and correcting such determined volume for temperature and atmospheric pressure to a selected reference temperature and pressure, whereby the ozone concentration in the ozone bearing gas may then be mathematically calculated from the information so obtained.

2. A non-aqueous method for determining the concentration of ozone in a specimen of atmospheric air, which comprises bubbling a measured quantity of said specimen slowly through a known quantity of a dilute solution of N - phenyl - 2 - naphthylamine in o-dichlorobenzene, and comparing the color of the ozone-modified solution so obtained with the colors obtained by passing through an identical solution of the same solute, of identical quantities of gases bearing varied but known concentrations of ozone, whereby the ozone concentration in said specimen may then be calculated mathematically from the information so obtained.

3. In the determination of the unknown ozone concentration in a specimen of atmospheric air, the method of obtaining the data necessary for the mathematical computation of such concentration, which comprises passing a measured stream of such specimen air in intimate direct contact with a predetermined quantity of a dilute solution of N - phenyl - 2 - naphthylamine in o-dichlorobenzene while at room temperature and atmospheric pressure, until a substantial color change occurs in such air-contacted solution, and measuring the degree of such color change in a mechanical colorimeter in comparison with color changes produced by passing identical quantities of gases bearing therein various but known concentrations of ozone through identical solutions of the same solute as that in contact with which said stream of atmospheric air was passed.

4. The method as set forth in claim 3, wherein the volume of said measured stream is corrected for temperature and atmospheric pressure for use in said mathematical computation.

5. The method as set forth in claim 2, wherein the volume of said specimen air is corrected for temperature and atmospheric pressure for use in said mathematical computation.

6. A non-aqueous method for determining the concentration of ozone in a specimen of atmospheric air which comprises establishing intimate direct contact between a measured quantity of such specimen air and a dilute solution of N - phenyl - 2 - naphthylamine in o-dichlorobenzene at room temperature and atmospheric pressure until a substantial color change occurs in said solution, comparing in a colorimeter the color of the solution so obtained with the colors obtained by passing known quantities of gases bearing various but known concentrations of ozone through fresh solutions identical with that used with said specimen of air to ascertain the equivalent quantity of ozone in said air specimen, and correcting to a selected standard the temperature and pressure of the volume of specimen air employed, whereby the ozone concentration per unit volume in said air specimen may be computed mathematically by multiplying the colorimeter scale reading for the color solution obtained from the specimen of air by the milligrams of ozone equivalent obtained by said comparison, and dividing the product by the corrected volume.

7. The method as set forth in claim 6, wherein the optimum solution concentration is about 0.01 M.

8. A non-aqueous method for determining the concentration of ozone in a specimen of atmospheric air which comprises establishing intimate direct contact between a measured quantity of such specimen air and a dilute solution of N - phenyl - 2 - naphthylamine in o-dichlorobenzene at room temperature and atmospheric pressure until a substantial color change occurs in said solution, comparing in a colorimeter the color of the solution so obtained with the colors obtained by passing known quantities of gases bearing various but known concentrations of ozone through fresh solutions identical with that used with said specimen of air to ascertain the equivalent quantity of ozone in said air specimen, correcting to a selected standard the temperature and pressure of the volume of specimen air employed, and then mathematically computing the ozone concentration per unit volume in said air specimen by multiplying the colorimeter scale reading for the color solution obtained by use of the air specimen by the milligrams of ozone equivalent, ascertained by said comparison, and dividing the product by the pressure and temperature corrected volume.

No references cited.